Jan. 15, 1924.  
H. S. PUTNAM  
1,480,634  
COUPLING MECHANISM FOR TRUCKS AND THE LIKE  
Filed June 22, 1923  
2 Sheets-Sheet 1
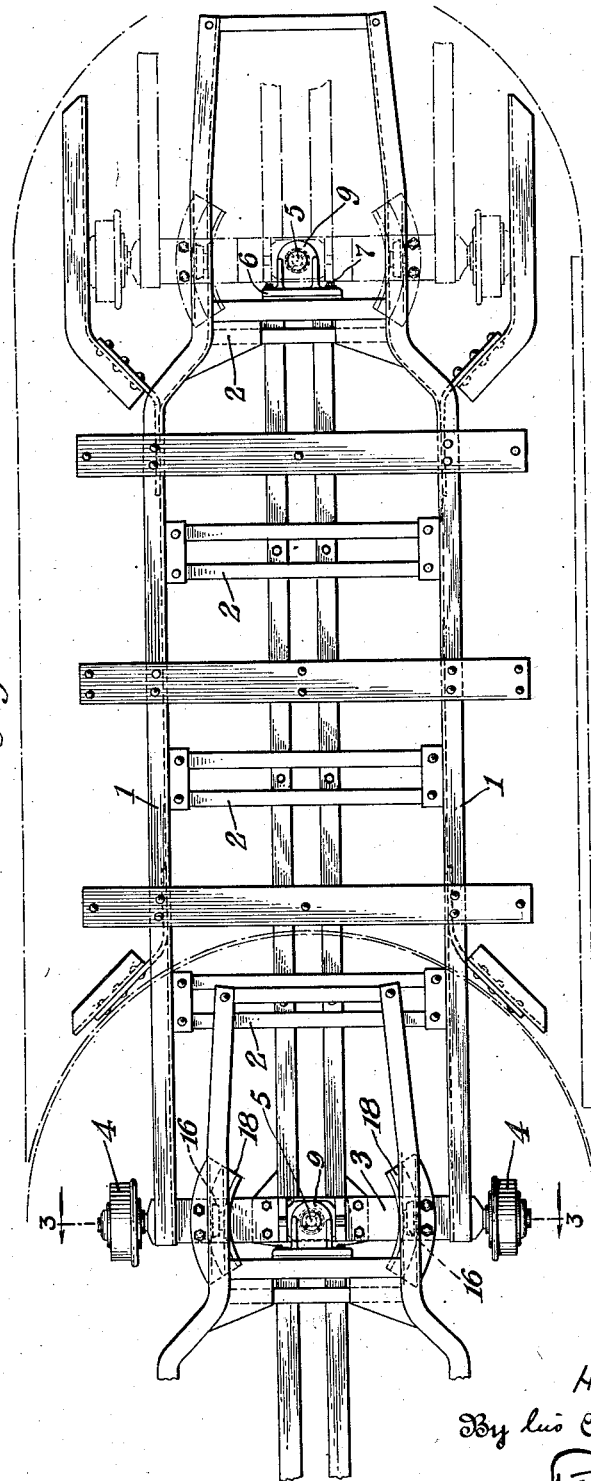
Inventor  
Henry S. Putnam  
By his Attorneys  
Prindle, Wright Neal & Bean Jan. 15, 1924.
H. S. PUTNAM
1,480,634
COUPLING MECHANISM FOR TRUCKS AND THE LIKE
Filed June 22, 1923    2 Sheets-Sheet 2
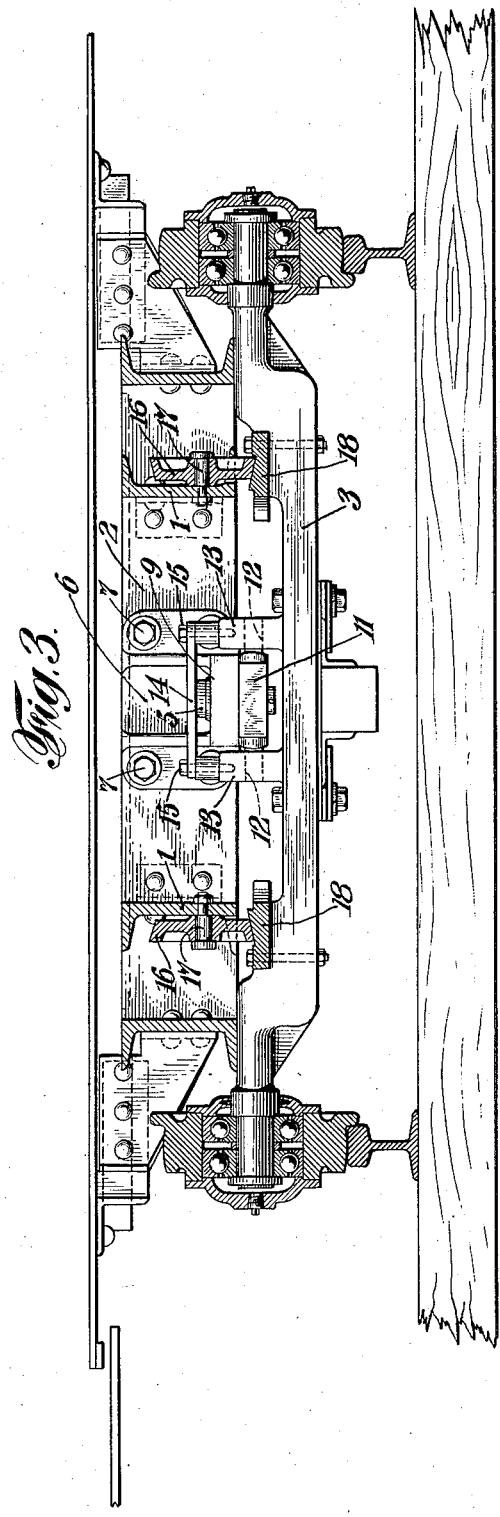
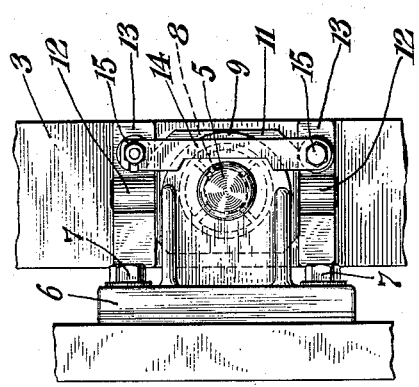
Inventor
Henry S. Putnam
By his Attorneys Patented Jan. 15, 1924.

1,480,634

UNITED STATES PATENT OFFICE.

HENRY S. PUTNAM, OF NEW YORK, N. Y., ASSIGNOR TO CONTINUOUS TRANSIT COMPANY, OF NEW YORK, N. Y., A CORPORATION OF DELAWARE.

COUPLING MECHANISM FOR TRUCKS AND THE LIKE.

Application filed June 22, 1923. Serial No. 647,135.

*To all whom it may concern:*

Be it known that I, HENRY S. PUTNAM, a citizen of the United States, a resident of 118 E. 54th St., New York, in the county of New York and State of New York, have invented a certain new and useful Coupling Mechanism for Trucks and the like, of which the following is a specification.

The invention relates to trucks or cars adapted to be coupled together to make up a train or moving platform, for example, of the type described in prior United States Patents Nos. 1,437,549 and 1,437,550, issued to me on December 5th, 1922.

One object of the invention is to provide a coupling mechanism for trucks of the above nature which will allow certain relative movements between adjacent trucks, as may be necessary, for example, in passing around curves or over grades and inclinations in the track. The invention also aims to provide a coupling mechanism of the above nature which will be simple and strong in construction and which may be readily applied to truck structures adapted for the above and similar purposes.

Further objects and advantages of the invention will be in part obvious and in part specifically pointed out in the description hereinafter contained, which, taken in connection with the accompanying drawings, discloses a preferred embodiment of the invention; such embodiment, however, is to be considered merely as illustrative of its principles. In the drawings:

Fig. 1 is a plan view showing the adjacent trucks connected together by means of a coupling mechanism made in accordance with the invention.

Fig. 2 is a central vertical section of the structure shown in Fig. 1.

Fig. 3 is a section on line 3—3 of Fig. 1 looking in the direction of the arrows.

Fig. 4 is an enlarged plan view of the coupling mechanism shown in Figs. 1 and 3.

The invention is illustrated as applied to trucks, each having wheels at one end only and adapted to be connected up into a train by coupling the unwheeled end of each truck to the wheeled end of an adjacent truck. As is shown more particularly in Figs. 1 and 2, each truck may be constructed in general of longitudinal supporting members 1, which are connected together by cross pieces 2, and an axle 3 at the rear end of each truck carries wheels 4 adapted to guide the same along a track.

At its remaining or opposite end, each truck is pivotally connected to the truck next preceding, by means of a king pin 5, which passes vertically through parts connected to the respective trucks, and thus permits the latter to turn in a horizontal plane as may be necessary in passing around curves.

In the present form of the invention, a draw bar member 6 is fastened to the central portion of the forward cross piece 2 of one truck, as by bolts 7, and the king pin 5 passes down through a hole 8, in a horizontal ledge 9 on the draw bar.

The coupling mechanism is also arranged to permit vertical angular movement between the trucks; and in the present instance the king pin 5 passes through a hole 10 in a trunnion member 11, which latter is provided with hubs 12, the hubs 12 of trunnion member 11 engaging between ears 13 mounted on the axle 3 of the forward truck, thus permitting the vertical rocking movements above mentioned, and also permitting the trunnion member to tilt laterally or slide up and down between the ears 13.

It will be noted that when the trucks are coupled together the forward end of each truck may be lifted from off the truck next preceding due to the sliding engagement between trunnion member 11 and ears 13, thus when a series of trucks are connected up to form a continuous loop platform any desired truck can be removed from the platform by lifting up the forward end of the truck next behind and raising out the truck which is desired to be replaced or repaired. The above feature is particularly important in endless platforms where relative longitudinal movement between the trucks cannot take place either in assembling or dis-assembling the trucks which make up the complete loop.

The axes of the hub 12 and king pin 5 are preferably in the same vertical plane with the axis of rotation of the wheels 4 on the forward truck.

I prefer also to limit the amount of vertical sliding which may take place under normal conditions between the trunnion member 11 and ears 13, as by providing a stop bar 14, which is clamped by bolts 15 to the ears 13, and passes over the ledge 9 of the draw bar. As shown in Fig. 4, however, the stop bar 14 is preferably hooked at one end so that it may be swung out from its position above draw bar member 6 in coupling or uncoupling adjacent trucks.

In the present embodiment of the invention the weight of the rear truck is distributed between the coupling mechanism and a pair of rollers 16 which, as shown, are journaled on stub shafts 17 extending from the forward ends of the supports 1 on the rear truck, such rollers engaging tracks 18 mounted on the axle 3, the tracks being accurately shaped about the axis of rotation of king pin 5.

Also the point of engagement between rollers 16 and tracks 18 is in line with the horizontal axis on which trunnion member 11 may swing, whereby vertical rocking movement between the trucks does not disturb the engagement of the rollers with their tracks; in case of lateral tilting or vertical sliding movements between the trucks, one or both of the rollers 16 will be released from its track 18.

While a specific embodiment of the invention has been disclosed, it will be obvious that many changes may be made therein without departing from its spirit, as defined in the following claims.

I claim:

1. In combination, adjacent trucks having wheels adapted to guide the same along a trackway, and coupling mechanism for said trucks comprising a vertical king pin pivotally engaging a part on one truck, a trunnion member pivoted on a horizontal axis to the other truck, said king pin also pivotally engaging said trunnion member.

2. In combination, adjacent trucks having wheels adapted to guide the same along a trackway, and a coupling mechanism for said trucks comprising a vertical king pin pivotally engaging parts connected respectively to said trucks, and a supporting means for one of said parts permitting angular movement thereof about a substantially horizontal axis.

3. In combination, adjacent trucks having wheels adapted to guide the same along a trackway, and a coupling mechanism for said trucks comprising a vertical king pin pivotally engaging parts connected respectively to said trucks, and a supporting means for one of said parts permitting lateral tilting thereof.

4. In combination, adjacent trucks having wheels adapted to guide the same along a trackway, and a coupling mechanism for said trucks comprising a vertical king pin pivotally engaging parts connected respectively to said trucks, and a supporting means for one of said parts permitting angular movement thereof about a substantially horizontal axis and also permitting lateral tilting thereof.

5. In combination, adjacent trucks each having wheels at one end only, and mechanism for coupling the remaining end of one of said trucks to the wheeled end of the other truck, said mechanism comprising a draw bar member on one truck, a trunnion member pivotally supported on the other truck to swing on a substantially horizontal axis, and a substantially vertical king pin pivotally connected to said draw bar and trunnion members.

6. In combination, adjacent trucks each having an axle at one end only, wheels supported by said axles adapted to guide the trucks along a trackway, and mechanism for coupling the remaining end of one of said trucks to the wheeled end of the other truck, said mechanism comprising a draw bar member on the first mentioned truck and projecting over the axle of the second mentioned truck, a trunnion member pivotally supported between ears on the second mentioned truck to permit swinging on a substantially horizontal axis and lateral tilting, and a substantially vertical king pin pivotally connected to said draw bar and trunnion members.

7. In combination, adjacent trucks each having wheels at one end only, and mechanism for coupling the remaining end of one of said trucks to the wheeled end of the other truck, said mechanism comprising a substantially vertical king pin pivotally connected to parts on the respective trucks, said first mentioned truck also having members projecting over the second truck and carrying rollers, said second mentioned truck carrying tracks for said rollers which are arcuately shaped about the axis of the king pin as a centre.

8. In combination, adjacent trucks each having an axle at one end only, wheels supported by said axles adapted to guide the trucks along a trackway, and mechanism for coupling the opposite end of one of said trucks to the wheeled end of the other truck, said mechanism comprising a draw bar member on the first mentioned truck projecting over the axle of the second mentioned truck, a substantially vertical king pin pivotally engaging said draw bar member, and a part connected to the second mentioned truck, said first mentioned truck having members disposed on opposite sides of the king pin and projecting over the axle of the second mentioned truck, rollers carried by said last mentioned members, and arcuately shaped guides carried by said axle adapted to engage said rollers.

9. In combination, adjacent trucks each having wheels at one end only, and mechanism for coupling the remaining end of one of said trucks to the wheeled end of the other truck, said mechanism comprising a substantially vertical king pin pivoted to a part on one truck, a trunnion member also pivotally connected to said king pin and pivotally supported on the other truck to swing on a substantially horizontal transverse axis, and rollers on one of said trucks engaging tracks on the other truck, said rollers and trucks engaging at points in line with the horizontal axis above-mentioned of said trunnion member.

10. The combination set forth in claim 1 wherein said coupling mechanism includes parts which are relatively slidable in vertical direction to permit the trucks to be disconnected by vertical movement of one of said trucks.

11. In combination, adjacent trucks having wheels at one end only, and mechanism for coupling the remaining end of one of said trucks to the wheeled end of the other truck, said mechanism comprising parts connected to the respective trucks which are disconnectible by movement of one of said trucks in vertical direction, said parts comprising trunnion members, and ears carried by forward trucks which slidably receive the trunnion members.

In testimony that I claim the foregoing, I have hereunto set my hand this 18th day of June, 1923.

HENRY S. PUTNAM.